US010881077B2

(12) United States Patent
Huck et al.

(10) Patent No.: US 10,881,077 B2
(45) Date of Patent: *Jan. 5, 2021

(54) LOW DENSITY PET LITTERS AND METHODS OF MAKING SUCH PET LITTERS

(71) Applicant: SOCIÉTÉ DES PRODUITS NESTLÉ S.A., Vevey (CH)

(72) Inventors: Nathan Foster Huck, Jackson, MO (US); Colin Muscroft, Glen Carbon, IL (US); David Odell Leinart, Ballwin, MO (US)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 934 days.

This patent is subject to a terminal disclaimer.

(21) Appl. No.: 15/298,971

(22) Filed: Oct. 20, 2016

(65) Prior Publication Data

US 2017/0112088 A1    Apr. 27, 2017

Related U.S. Application Data

(60) Provisional application No. 62/245,349, filed on Oct. 23, 2015.

(51) Int. Cl.
| | |
|---|---|
| *A01K 1/015* | (2006.01) |
| *B01J 20/10* | (2006.01) |
| *B01J 20/12* | (2006.01) |
| *B01J 20/20* | (2006.01) |
| *B01J 20/24* | (2006.01) |
| *B01J 20/28* | (2006.01) |
| *B01J 20/30* | (2006.01) |
| *A01K 1/01* | (2006.01) |

(52) U.S. Cl.
CPC .......... *A01K 1/0154* (2013.01); *A01K 1/0107* (2013.01); *A01K 1/0152* (2013.01); *A01K 1/0155* (2013.01); *B01J 20/106* (2013.01); *B01J 20/12* (2013.01); *B01J 20/20* (2013.01); *B01J 20/24* (2013.01); *B01J 20/28011* (2013.01); *B01J 20/28016* (2013.01); *B01J 20/3021* (2013.01); *B01J 20/3035* (2013.01); *B01J 20/3042* (2013.01)

(58) Field of Classification Search
CPC .. A01K 1/0152; A01K 1/0154; A01K 1/0155; A01K 1/0107
USPC ......................... 119/171–173, 447; 424/76.6
See application file for complete search history.

(56) References Cited

U.S. PATENT DOCUMENTS

| | | | |
|---|---|---|---|
| 3,993,498 A * | 11/1976 | Koekemoer | A01N 25/12 106/456 |
| 5,152,250 A | 10/1992 | Loeb | |
| 5,193,489 A | 3/1993 | Hardin | |
| 5,303,676 A | 4/1994 | Lawson | |
| 5,359,961 A | 11/1994 | Goss | |
| 5,421,291 A | 6/1995 | Lawson | |
| 5,526,770 A | 6/1996 | Kiebke | |
| 5,609,123 A | 3/1997 | Luke | |
| 5,634,431 A | 6/1997 | Reddy | |
| 5,638,770 A | 6/1997 | Peleties | |
| 5,655,480 A | 8/1997 | Steckel | |
| 5,664,523 A | 9/1997 | Ochi | |
| 5,724,915 A | 3/1998 | Ochi | |
| 5,826,543 A | 10/1998 | Raymond | |
| 5,836,263 A | 11/1998 | Goss | |
| 5,927,049 A | 7/1999 | Simard | |
| 5,960,743 A | 10/1999 | Taylor | |
| 5,961,968 A | 10/1999 | Moore | |
| 5,992,351 A | 11/1999 | Jenkins | |
| 6,014,947 A | 1/2000 | Sladek | |
| 6,053,125 A | 4/2000 | Kory | |
| 6,089,190 A | 7/2000 | Jaffee | |
| 6,101,978 A | 8/2000 | Steckel | |
| 6,276,300 B1 | 8/2001 | Lewis | |
| 6,287,550 B1 | 9/2001 | Trinh | |
| 6,308,658 B1 | 10/2001 | Steckel | |
| 6,346,240 B1 | 2/2002 | Moore | |
| 6,568,349 B1 | 5/2003 | Hughes | |
| 6,657,098 B1 | 12/2003 | Niki | |
| 6,745,720 B2 | 6/2004 | Rasner | |
| 6,868,802 B2 | 3/2005 | McPherson | |
| 7,011,824 B2 | 3/2006 | Moore | |

(Continued)

FOREIGN PATENT DOCUMENTS

| | | |
|---|---|---|
| AU | 2005202838 | 1/2006 |
| DE | 4312279 | 10/1994 |
| DE | 4427334 | 2/1996 |
| EP | 1353548 | 10/2005 |
| EP | 1139726 | 4/2006 |
| GB | 2318495 | 4/1998 |
| JP | H10225633 | 8/1998 |
| JP | 04649707 | 6/2000 |
| JP | 04175726 | 10/2000 |
| JP | 2003019190 | 1/2003 |

(Continued)

OTHER PUBLICATIONS

International Search Report and Written Opinion for PCT Application No. PCT/IB16/095005 dated Feb. 21, 2017.
International Search Report and Written Opinion for PCT Application No. PCT/IB016/095006 dated Feb. 21, 2017.
International Search Report and Written Opinion for PCT Application No. PCT/US2013/077396 dated Mar. 17, 2014.

*Primary Examiner* — Peter M Poon
*Assistant Examiner* — Danielle A Clerkley

(57) ABSTRACT

Compacting expanded perlite fines in the presence of a small amount of binder (starch and/or clay) and water, followed by drying, produces particles with low density, good integrity, and surprisingly higher absorption by volume than non-compacted expanded perlite or non-swelling clay. Furthermore, addition of a small amount of clumping agent (e.g., guar gum) to the compacted granules results in a clumping litter with low density, good integrity and comparable clumping ability to traditional clay clumping litter.

11 Claims, No Drawings

(56) References Cited

U.S. PATENT DOCUMENTS

| | | |
|---|---|---|
| 7,041,279 B1 | 5/2006 | Ali |
| 7,316,201 B2 | 1/2008 | Rasner |
| 7,343,874 B2 | 3/2008 | DeLeeuw |
| 7,467,600 B2 | 12/2008 | Ikegami |
| 7,595,429 B2 | 9/2009 | Hursey |
| 7,603,964 B2 | 10/2009 | Jenkins |
| 7,665,418 B2 | 2/2010 | Bracilovic |
| 7,753,002 B2 | 7/2010 | Wang |
| 8,074,604 B2 | 12/2011 | Swank |
| 8,096,267 B2 | 1/2012 | Greene |
| 8,232,401 B2 | 7/2012 | Satoh |
| 8,252,344 B2 | 8/2012 | Hursey |
| 8,268,018 B2 | 9/2012 | Privitera |
| 8,383,819 B2 | 2/2013 | Matsuda |
| 8,429,849 B2 | 4/2013 | Bertin |
| 8,453,604 B2 | 6/2013 | Matsuo |
| 8,490,578 B2 | 7/2013 | Hughes |
| 8,955,294 B2 | 2/2015 | Free |
| 9,547,000 B2 * | 1/2017 | Gravel-Lacroix ... A01K 1/0152 |
| 9,986,714 B2 * | 6/2018 | Huck .................... A01K 1/01 |
| 2005/0005870 A1 | 1/2005 | Fritter |
| 2005/0056229 A1 | 3/2005 | Greene |
| 2006/0042515 A1 * | 3/2006 | Bodycomb ............ C04B 18/02 |
| | | 106/698 |
| 2006/0065200 A1 | 3/2006 | Jenkins |
| 2006/0243212 A1 | 11/2006 | Jenkins |
| 2007/0289543 A1 * | 12/2007 | Petska .................. A01K 1/0155 |
| | | 119/173 |
| 2008/0022940 A1 * | 1/2008 | Kirsch ................. A01K 1/0152 |
| | | 119/173 |
| 2008/0029039 A1 * | 2/2008 | Jenkins ................ A01K 1/0152 |
| | | 119/173 |
| 2008/0223302 A1 | 9/2008 | Wang |
| 2008/0251027 A1 * | 10/2008 | Kirsch ................. A01K 1/0152 |
| | | 119/173 |
| 2009/0217882 A1 * | 9/2009 | Jenkins ................ A01K 1/0152 |
| | | 119/173 |
| 2010/0107931 A1 | 5/2010 | Roulston |
| 2011/0174228 A1 | 7/2011 | Liu |
| 2012/0118242 A1 | 5/2012 | Cheeseman |
| 2014/0174370 A1 | 6/2014 | Huck |

FOREIGN PATENT DOCUMENTS

| | | |
|---|---|---|
| JP | 2003116389 | 4/2003 |
| JP | 2004514438 | 5/2004 |
| JP | 05183166 | 6/2009 |
| KR | 1998083194 | 2/2005 |
| RU | 2158078 | 10/2000 |
| RU | 2422829 C2 | 6/2011 |
| RU | 2503174 C1 | 1/2014 |
| RU | 2510167 C1 | 3/2014 |
| WO | 2001050843 | 7/2001 |
| ZA | 201107861 | 7/2012 |

\* cited by examiner

LOW DENSITY PET LITTERS AND METHODS OF MAKING SUCH PET LITTERS

CROSS REFERENCE TO RELATED APPLICATIONS

This application claims priority to U.S. Provisional Application No. 62/245,349 filed Oct. 23, 2015, the disclosure of which is incorporated by references in its entirety.

BACKGROUND

The present disclosure relates generally to a low density absorbent material which can be used in both clumping and non-clumping pet litter. More specifically, the present disclosure is directed to low density pet litters comprising compacted particles of expanded perlite and methods for making and using such pet litters Litter boxes are used by pets such as cats for elimination of urine and fecal matter. A litter box contains a layer of pet litter that receives the urine and fecal matter. The pet litter is granular, absorbent and either non-clumping or clumping. A clumping pet litter is a litter product in which the particles facilitate formation of clumps after the urine and fecal matter is deposited in the pet litter. The clumps are typically sifted from the litter box using a litter scoop and then discarded. Non-clumping pet litter is typically better at absorbing urine and thus removing urine odors, but replacing soiled non-clumping pet litter without emptying the entire box of litter can be difficult.

Consumers fill their litter boxes based on volume, so litters should be highly absorbent by volume. However, traditional absorbent litters are bulky and dense, and thus packages of such litters are heavy and difficult to handle.

Existing litters include compositions made from clay minerals, silica gel, and agricultural wastes. Clay minerals are absorptive but also heavy. Silica gel is also absorptive, but the commonly used aggregate shape and size can have poor cat acceptance, which can lead to house soiling and/or a risk of urinary minerals aggregating into stones or crystallizing in a cat. Agricultural wastes are also absorptive, but many are in pellet form and can have poor animal acceptance. Agricultural waste litters, due to their composition, may also serve as food source and thus support growth of odor causing microorganisms in the litter box.

U.S. Pat. No. 5,655,480 to Steckel et al. discloses an animal control litter comprised of a clumping agent, a surfactant, an odor control agent and light weight aggregate expanded to form porous surfaces by subjecting the aggregate to a temperature of 1,800° F. This litter has a density between 5 and 10 lb/ft$^3$. However, the material is less absorptive by volume than clay. Additionally, the expanded perlite aggregate material is fragile and can break down easily. The material may also be "too light" for good cat acceptance.

SUMMARY

The present disclosure relates to low density pet litters comprising compacted particles of expanded perlite, preferably having a diameter smaller than 30 mesh (that is, a diameter smaller than 595 microns) and preferably as the primary ingredient in the litter. As a non-limiting example, about 95% or more of the perlite fines in the compacted particles can have a diameter smaller than 30 mesh (that is, a diameter smaller than 595 microns) and no greater than about 5% of the compacted particles can be up to 4 mesh (that is, have a diameter greater than 4.76 mm).

The present inventors unexpectedly found that compacting expanded perlite fines in the presence of a small amount of starch and water, followed by drying, produces particles with low density, good integrity, and surprisingly higher absorption by volume than non-compacted expanded perlite or non-swelling clay. Furthermore, addition of a small amount of clumping agent (e.g., guar gum) to the compacted granules results in a clumping litter with low density, good integrity and comparable clumping ability to traditional clay clumping litter.

Accordingly, in a general embodiment, the present disclosure provides a method of making a pet litter. The method comprises: compacting a material comprising expanded perlite fines to form a compacted material comprising expanded perlite; breaking the compacted material comprising expanded perlite to form particles of the compacted material comprising expanded perlite; separating the particles which have a size within a predetermined size range from a remainder of the particles; drying the particles which have the size within the predetermined size range; and using the dried particles as at least a portion of the pet litter. In another embodiment, the present disclosure provides a pet litter made by this method.

In an embodiment, the expanded perlite fines have a size not greater than about 600 microns. In one embodiment, the expanded perlite fines have a diameter from about 50 microns to about 600 microns, alternatively from about 100 microns to about 550 microns, alternatively from about 150 microns to about 500 microns, alternatively from about 200 microns to about 450 microns, alternatively from about 250 microns to about 400 microns, alternatively from about 300 microns to about 350 microns.

In one embodiment, the breaking of the compacted material comprising expanded perlite fines and/or drying are optional.

In an embodiment, the compacting is performed at a pressure from about 500 psi (3447 kPa) to about 1,300 psi (8963.18 kPa).

In an embodiment, the material comprises about 0.25 wt % to about 5.0 wt % of a binder. The binder can be starch (e.g., pre-gelled cereal starch) and/or clay. At least a portion of the binder can be added to the expanded perlite fines as a dry mix before the compacting of the material. At least a portion of the binder can be pre-blended with water and then added to the expanded perlite fines before the compacting of the material.

In an embodiment, the water in the material comprises about 15.0 wt % to about 25.0 wt % of water.

In an embodiment, the material comprises about 50 wt % to about 85 wt % of the expanded perlite fines.

In an embodiment, the predetermined size range is about 595 microns to about 2,380 microns.

In an embodiment, the particles are dried to a moisture content of about 0.25 wt % to about 10.0 wt %.

In another embodiment, the present disclosure provides a pet litter comprising dried particles of compacted material comprising expanded perlite, the particles having a density of about 25.0 lb/ft$^3$ to about 45.0 lb/ft$^3$, preferably about 30.0 lb/ft$^3$ to about 42.0 lb/ft$^3$.

In an embodiment, the litter is a non-clumping litter that does not contain a clumping agent.

In an embodiment, the litter is a clumping litter comprising a clumping agent. The clumping agent can be selected from the group consisting of bentonite, guar gum, starches, xanthan gum, gum Arabic, gum acacia, silica gel, and mixtures thereof.

In an embodiment, the pet litter further comprises an additive selected from the group consisting of an odor control agent, a fragrance, an anti-microbial agent, an anti-sticking agent, an agent for controlling pH, a dye, a coloring agent, a de-dusting agent, a disinfectant, and combinations thereof. An odor control agent can be carbon, particularly activated carbon.

In another embodiment, the present disclosure provides a method of managing animal waste. The method comprises using pet litter comprising dried particles of compacted material comprising expanded perlite, the particles having a density of about 25.0 lb/ft$^3$ to about 45.0 lb/ft$^3$ (preferably about 30.0 lb/ft$^3$ to about 42.0 lb/ft$^3$) in a litter box.

In another embodiment, the present disclosure provides a method of treating out-of-box elimination of a pet. The method comprises using pet litter comprising dried particles of compacted material comprising expanded perlite, the particles having a density of about 25.0 lb/ft$^3$ to about 45.0 lb/ft$^3$ (preferably about 30.0 lb/ft$^3$ to about 42.0 lb/ft$^3$) in a litter box located in a building in which the pet resides.

In another embodiment, the present disclosure provides a method of treating, preventing or reducing the risk of a lower urinary tract disease in a cat. The method comprises using pet litter comprising dried particles of compacted material comprising expanded perlite, the particles having a density of about 25.0 lb/ft$^3$ to about 45.0 lb/ft$^3$ (preferably about 30.0 lb/ft$^3$ to about 42.0 lb/ft$^3$) in a litter box located in a building in which the cat resides.

An advantage of one or more embodiments provided by the present disclosure is to provide improved pet litters.

Another advantage of the present disclosure is to provide methods of making improved pet litters.

A further advantage of the present disclosure is to provide pet litters that have a low density without sacrificing particle integrity or absorptive performance.

Still another advantage of the present disclosure is to provide pet litters that have both a low density and good pet acceptance.

Yet another advantage of the present disclosure is to enable lighter packages of pet litter without decreasing the volume thereof.

Another advantage of the present disclosure is to enable a pet owner to more easily purchase, transport and utilize a package of pet litter.

A further advantage of the present disclosure is to provide a low density granular absorbent with good particle integrity and having surprisingly improved absorption relative to traditional clay litter and the pre-processed principal raw material.

Still another advantage of the present disclosure is to provide a material that can be used as an improved non-clumping pet litter or employed in a formulation for an improved clumping pet litter.

Additional features and advantages are described herein and will be apparent from the following Detailed Description.

DETAILED DESCRIPTION

As used in this disclosure and the appended claims, the singular forms "a," "an" and "the" include plural referents unless the context clearly dictates otherwise. Thus, for example, reference to "a material" or "the material" includes two or more materials.

The words "comprise," "comprises" and "comprising" are to be interpreted inclusively rather than exclusively. Likewise, the terms "include," "including" and "or" should all be construed to be inclusive, unless such a construction is clearly prohibited from the context.

However, the devices and compositions disclosed herein may lack any element that is not specifically disclosed. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified. "Consisting essentially of" means that the embodiment comprises more than 50% of the identified components, preferably at least 75% of the identified components, more preferably at least 85% of the identified components, most preferably at least 95% of the identified components, for example at least 99% of the identified components.

The term "and/or" used in the context of "X and/or Y" should be interpreted as "X," or "Y," or "X and Y." Where used herein, the terms "example" and "such as," particularly when followed by a listing of terms, are merely exemplary and illustrative and should not be deemed to be exclusive or comprehensive. Any embodiment disclosed herein can be combined with any other embodiment disclosed herein unless explicitly stated otherwise.

All percentages expressed herein are by weight of the total weight of the composition unless expressed otherwise. As used herein, "about" and "approximately" are understood to refer to numbers in a range of numerals, for example the range of −10% to +10% of the referenced number, preferably within −5% to +5% of the referenced number, more preferably within −1% to +1% of the referenced number, most preferably within −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Numerical adjectives, such as "first" and "second," are merely used to distinguish components. These numerical adjectives do not imply the presence of other components, a relative positioning, or any chronological implementation. In this regard, the presence of a "second widget" does not imply that a "first widget" is necessarily present. Further in this regard, a "second widget" can be used before, after, or simultaneously with any "first widget."

The terms "pet" and "animal" are used synonymously herein and mean any animal which can use a litter box, non-limiting examples of which include a cat, a dog, a rat, a ferret, a hamster, a rabbit, an iguana, a pig or a bird. The pet can be any suitable animal, and the present disclosure is not limited to a specific pet animal. The term "elimination" means urination and/or defecation by a pet.

As used herein, the term "litter" means any substance that can absorb animal urine and/or decrease odor from animal urine and/or feces. A "clumping litter" forms aggregates in the presence of moisture, the aggregates distinct from the other litter in the litter box. A "non-clumping litter" does not form distinct aggregates.

The term "litter box" means any apparatus that can hold pet litter, for example a container with a bottom wall and one or more side walls, and/or any apparatus configured for litter to be positioned thereon, for example a mat or a grate. As a non-limiting example, a litter box may be a rectangular box having side walls that have a height of at least about six inches.

The term "mesh" is defined by the ASTM E-11 U.S.A. standard specification for sieves. As used herein, "size" of a particle refers to the length of the longest dimension of the particle.

The methods and devices and other advances disclosed herein are not limited to particular methodologies, protocols, and reagents because, as the skilled artisan will appreciate, they may vary. Further, the terminology used herein is for the purpose of describing particular embodiments only and does not limit the scope of that which is disclosed or claimed.

Unless defined otherwise, all technical and scientific terms, terms of art, and acronyms used herein have the meanings commonly understood by one of ordinary skill in the art in the field(s) of the present disclosure or in the field(s) where the term is used. Although any compositions, methods, articles of manufacture, or other means or materials similar or equivalent to those described herein can be used, the preferred devices, methods, articles of manufacture, or other means or materials are described herein.

An aspect of the present disclosure is a method of making a pet litter. The method can comprise compacting a material comprising expanded perlite fines, a binder and water, for example using compacting rolls.

The compacting can be performed at a compaction roll back-pressure of at least about 500 psi (3447 kPa), for example about 500 psi (3447 kPa) to about 1,300 psi (8963.18 kPa), such as about 500 psi (3447 kPa) to about 800 psi (5516 kPa) or about 800 psi (5516 kPa) to about 1,300 psi (8963.18 kPa). The size of the expanded perlite fines is preferably not greater than about 30 mesh (that is, having a diameter not greater than 595 microns). As a non-limiting example, about 95% or more of the perlite fines in the compacted particles can be smaller than 30 mesh (that is, having a diameter smaller than 595 microns) and no greater than about 5% of the compacted particles can be up to 4 mesh (that is, having a diameter greater than 4.76 mm). In an embodiment, the expanded perlite fines comprise particles eliminated in step 101 of the method 100 disclosed in U.S. Patent App. Pub. No. 2014/0174370 to Huck et al., herein incorporated by reference in its entirety.

The present disclosure is not limited to a specific means of forming the compacted particles, and other means of compaction or agglomeration of the perlite fines can be employed additionally or alternatively to compacting rolls. These other means include, for example, tumble/growth agglomeration; low-, medium-, or high pressure agglomeration; punch and die; roller press; high shear mixer granulator; extrusion; and combinations thereof.

Perlite is a generic term for a naturally occurring siliceous rock. One feature which sets perlite apart from other volcanic glasses is that when heated to a suitable point in its softening range, perlite expands from four to twenty times the original volume. This expansion is due, at least in part, to the presence of two to six percent combined water in the crude perlite rock. Firing, i.e., quickly heating to above 1,600° F. (871° C.), causes the crude rock to pop in a manner similar to popcorn yielding a very open, highly porous structure referred to as expanded perlite.

In an embodiment, the amount of expanded perlite fines is about 50 wt % to about 85 wt % of the material, for example about 70 wt % to about 80 wt %, preferably about 75 wt % of the material. In an embodiment, the amount of the water is about 15 wt % to about 25 wt % of the material, for example about 20 wt % of the material.

In an embodiment, the amount of the binder is about 0.25 wt % to about 5.0 wt % of the material, for example about 1.0 wt % to about 4.0 wt %, preferably about 3.0 wt % to about 3.5 wt % of the material. The binder can be starch and/or clay. Preferably, the starch (if any) comprises a cereal starch, for example starch from one or more of rice, millet, wheat, corn or oats. In a preferred embodiment, the starch (if any) comprises pre-gelled cereal starch and can include any waxy or high amylose varieties thereof. The clay can be swelling or non-swelling. Preferably, the clay (if any) comprises one or more clay minerals selected from the group consisting of kaolin, smectite, illite, chlorite, sepiolite, and atapulgite. In a preferred embodiment, the clay (if any) comprises a montmorillonite smectite and most preferably sodium or calcium montmorillonite.

At least a portion of the binder can be added to the expanded perlite fines as a dry mix before the compacting. Alternatively or additionally, at least a portion of the binder can be pre-blended with at least a portion of the water and then added to the expanded perlite fines before the compacting.

In an embodiment, the compacting forms a compacted material such as sheets and/or briquettes of compacted expanded perlite fines. However, the compacted material is not limited to a specific shape, size or form. Furthermore, as noted above, the present disclosure is not limited to a specific means of compaction or agglomeration of the perlite fines to form the compacted material. For example, the compacted material can be in the form of a pellet (e.g., a flattened pellet), a tablet or a puck.

Then the compacted material can be ground and/or crushed, for example by a milling system or any other suitable apparatus known to one skilled in the art, to obtain particles of compacted material comprising expanded perlite. One or more sieves can be used to obtain the particles of compacted material comprising expanded perlite that have a desired size by separating the particles having the desired size from the remainder of the particles. The desired particle size is preferably from about 30 mesh (595 microns) to about 8 mesh (2,380 microns). Preferably, the particles of compacted material comprising expanded perlite are not evenly distributed within the size range. Commercially available shaker screens may be utilized.

The particles of compacted material comprising expanded perlite that have the desired size can be subjected to drying to remove moisture from the particles without substantially damaging the particles. For example, the particles can be transferred to a dryer such as a fluidized bed dryer. The resultant moisture level can be about 0.25% to about 10%, for example about 2%.

The dried particles of compacted material comprising expanded perlite preferably have a density of about 25 lb/ft$^3$ to about 45 lb/ft$^3$, more preferably about 30 lb/ft$^3$ to about 42 lb/ft$^3$.

In some embodiments, the dried particles of compacted material comprising expanded perlite are combined with a clumping agent; i.e., an agent that binds adjacent particles when wetted. The combination of the dried particles with the clumping agent can be performed in a mixer and can form at least a portion of a clumping pet litter. The clumping litter preferably comprises the dried compacted particles and the clumping agent in a ratio from 99:1 to 94:6, for example about 96:4. Non-limiting examples of suitable clumping agents include bentonite (such as sodium bentonite), guar gum, starches, xanthan gum, gum Arabic, gum acacia, silica gel, other minerals, and mixtures thereof. A preferred embodiment of the clumping agent comprises guar gum. Nevertheless, in an embodiment, starch is used in the binder and additional starch is used in the clumping agent, although the starch used in the binder is added to the expanded perlite fines before and/or during compacting, and the starch used in the clumping agent is added to the particles of compacted perlite, preferably after drying.

In other embodiments, the dried particles of compacted material comprising expanded perlite are not coated with a clumping agent, and the dried particles of compacted material comprising expanded perlite form at least a portion of a non-clumping litter. In such embodiments, the dried particles can be packaged directly after the drying without further processing.

Various additives may be optionally applied to the dried compacted particles. Non-limiting examples of suitable additives include an odor control agent, a fragrance, an anti-microbial agent, an anti-sticking agent, an agent for controlling pH, a dye, a coloring agent, a de-dusting agent, a disinfectant, and combinations thereof. In an embodiment, at least a portion of the dried compacted particles are coated with a colorant.

For embodiments in which the pet litter is a non-clumping litter, the additives can be applied to the dried compacted particles directly after the drying, to form the non-clumping litter, without further processing. Then the non-clumping litter can be packaged directly after the application of the additives, without further processing.

For embodiments in which the pet litter is a clumping litter, the additives and the clumping agent, together or separately, can be combined with the dried compacted particles directly after the drying, to form the clumping litter, without further processing. Then the clumping litter can be packaged directly after the combination, without further processing.

In a preferred embodiment, the pet litter does not contain clay. In a preferred embodiment, the pet litter does not contain agricultural products, such as alfalfa, corn, corn stalk, corn flour, oat hull, oat stalk, oat flour, barley hull, barley meal, barley stalk, barley flour, wheat hull, wheat straw, wheat flour, soybean hull, soybean meal, soybean floor, rye hull, rye meal, rye straw, rye flour, rice straw, rice hull, sorghum straw, sorghum hull, sunflower seeds, bamboo, lemongrass, switchgrass, catnip, oregano, parsley, rosemary, sage, thyme, valerian root, alyssum, chrysanthemum, honeysuckle, hops, lavender, apples, berries, orange peels, orange pulp, sunflower hulls, coffee, tea, sawdust, paper, cellulose, corncob, corn kernel, Distillers Dried Grain (DDG), corn pellet, oaf pellet, barley pellet, wheat middlings, soybean pellet, rye pellet, rice grain, rice pellet, sorghum grain, sorghum pellet, sunflower seed, almond, pistachio, walnut, pecan, hazelnut, peanut, acorn, wheat middlings, wheat straws, or combinations thereof.

Another aspect of the present disclosure is a pet litter comprising dried particles of compacted material comprising expanded perlite, the dried particles having a density of about 25 lb/ft$^3$ to about 45 lb/ft$^3$, preferably about 30 lb/ft$^3$ to about 42 lb/ft$^3$. Yet another aspect of the present disclosure is a pet litter made by any of the methods disclosed herein.

Another aspect of the present disclosure is a sealed package at least partially enclosing any of the embodiments of the pet litter disclosed herein, for example a sealed box or a sealed bag containing such pet litter. A further aspect of the present disclosure is a method of using a pet litter, the method comprising positioning at least a portion of a pet litter contained by a package into a litter box. The method can manage animal waste, such as cat urine; prevent or treat cat out-of-box elimination; or treat or prevent lower urinary tract diseases in a cat, such as urinary plugs, struvite or oxalite stones, idiopathic cystitis, or renal reflux. In an embodiment, one or more of the pet litters disclosed herein are used to treat a cat having an out-of-box elimination issue. As used herein, a cat that has "an out-of-box elimination issue" is a cat that has eliminated outside of the litter box at least once in the last month, and in an embodiment eliminated outside of the litter box at least once in the last week.

EXAMPLES

The following non-limiting examples are illustrative of embodiments of the pet litters provided by the present disclosure and advantages thereof.

Example 1: Absorbent Granule Production—1

Absorbent granules were produced using a compaction process.
1. Expanded perlite fines, starch, and water were blended and then fed into a set of compacting rolls (Table 1).
2. The compaction rolls, having roll back-pressure force set-point of 1,300 psi, formed the in-feed into pellets.
3. The pellets were then crushed and sized to −8/+30 mesh.
4. The screened material was then dried to a moisture content of approx. 2%.
5. After drying, the granular absorbent material was evaluated for density, absorption, and particle integrity (attrition).

TABLE 1

| | Litter Formulation (pre-dried) | | | |
| --- | --- | --- | --- | --- |
| Ingredient | Example 1 | Example 2 | Example 3 | Example 7 |
| Swelling Clay (Bentonite) | — | — | 3.2% | — |
| Non-Swelling Clay | — | 7.9% | — | — |
| Perlite Fines | 76.3% | 69.6% | 74.3% | 73.3% |
| Starch | 3.7% | 2.5% | 2.5% | 3.6% |
| Water | 20.0% | 20.0% | 20.0% | 20.0% |
| Guar | — | — | — | 3.1% |

Example 2: Absorbent Granule Production—2

Absorbent granules were produced using a compaction process.
1. Expanded perlite fines, starch, non-swelling calcium montmorillonite clay, and water were blended and then fed into a set of compacting rolls (Table 1).
2. The compaction rolls, having roll back-pressure force set-point of 1,300 psi, formed the in-feed into pellets.
3. The pellets were then crushed and sized to −8/+30 mesh.
4. The screened material was then dried to a moisture content of approx. 2%.
5. After drying, the granular absorbent material was evaluated for density, absorption, and particle integrity (attrition).

Example 3: Absorbent Granule Production—3

Absorbent granules were produced using a compaction process.

1. Expanded perlite fines, starch, sodium bentonite, and water were blended and then fed into a set of compacting rolls (Table 1).
2. The compaction rolls, having roll back-pressure force set-point of 1,300 psi, formed the in-feed into pellets.
3. The pellets were then crushed and sized to −8/+30 mesh.
4. The screened material was then dried to a moisture content of approx. 2%.
5. After drying, the granular absorbent material was evaluated for density, absorption, and particle integrity (attrition).

Example 4: Bulk Density Measurement

The bulk density of the absorbent granules from Example 1 was measured using a filling hopper (800 284-5779 Seedburo®; part number 151 Filling Hopper complete with 64P Pan), stand, and pint sized (550.06 cm³ dry volume) sample cup according to the procedure below:
1. The litter was poured into the filling hopper until it was full.
2. Next, the empty pint cup was placed on a balance and the balance was zeroed.
3. The cup was then placed beneath the filling hopper. The distance between the filling hopper discharge, and the top edge of the cup was set at 2 inches.
4. The filling hopper discharge slide was then opened to allow product to fall into the empty sample cup. Litter was allowed to flow until the cup was full, and then for an additional 1 to 2 seconds of overflow.
5. A straight edge was then used to remove excess product from the top of the cup; leveling the cup contents with the rim of the cup.
6. The cup with litter was then returned to the balance and the weight of the litter recorded.
7. Steps 1-6 were repeated three times.
8. Mass value was converted to pounds per cubic foot (lb/ft³) using the conversion factor 1 gram per cubic centimeter (gm/cm³) equals 62.4269 lb/ft³ (1 gram per dry pint (g/dry-pt) equals 0.113358 lb/ft³).

The average bulk density and standard deviation were calculated and reported in Table 2. As shown in Table 2, the tested pet litter was significantly less dense than the clay litter benchmarks.

Example 5: Absorption by Volume Measurement

The absorption by volume of the litter from Example 1 was measured using a bulk density apparatus (800 284-5779 Seedburo®; part number 151 Filling Hopper complete with 64P Pan); a straight-edge such as a 12 inch ruler; a funnel; a ring support (4") and support stand (24"); a graduated cylinder (at least 250 ml); an interval timer; and a specimen cup with a known volume (150 ml) according to the procedure below.
1. A representative portion of sample was used to fill about ¾ of the hopper of the bulk density apparatus.
2. A tared specimen cup was placed under the center of the hopper approx. 2¾ inches below the gate opening. The hopper gate was opened quickly and the sample allowed to fill the cup and overflow into the pan below.
3. The sample was leveled to the top edge of the specimen cup using a straight edge and sawing motion. The volume of the sample was now assumed to be equivalent to the volume of the specimen cup.
4. The sample was then transferred to the sorption funnel. The sorption funnel was positioned above the graduated cylinder using the ring support and stand so that the clamped hose end extended ½" to 1" into the cylinder.
5. Using the graduated cylinder as a measure and transfer vessel, 250 ml of cold tap water ($V_{initial}$) was added to the sorption funnel.
6. After a 10 minute soak time, the 250 ml graduated cylinder was placed under the funnel drain hose and the hose clamp released.
7. Water from the funnel was allowed to drain into the graduated cylinder for 5 minutes.
8. Using fingers, the hose was squeezed to release any water trapped therein.
9. The graduated cylinder was examined, and the total volume of water drained from the recorded ($V_{final}$).

Volume of water absorbed (ml)=$V_{initial}$ (initial water volume)−$V_{final}$ (final water volume) % Absorption by volume=(Volume of water absorbed (ml)/Volume of specimen cup (ml))×100  Calculation of Percentage Absorption by Volume:

Average values were recorded and are reported in Table 2. Referring to Table 2, absorption by volume of the tested pet litter is surprisingly greater than that of both the non-clumping clay litter benchmark and intact granules of expanded perlite of the size −8/+30 mesh.

Example 6: Particle Integrity (Attrition) Measurement

The attrition of the absorbent material from Example 1 was measured according to the procedure below:
1: A representative sample of between 150 mL and 300 mL was collected and hand sieved on a 8" diameter 30 mesh sieve. Any particles that passed through were discarded, and any that remained on the screen or stuck in the screen were brushed out and kept for further analysis.
2. The sample was then poured into the bulk density hopper (Seedburo®; part number 151 Filling Hopper) and released into a tared ¼ cup measuring cup (60 mL). A straight edge was used to strike off the excess material from the measuring cup.
3. The tared measuring cup with the material was then placed on the scale to find the original mass of the sample, MO.
4. The weighed sample was poured onto a 40 mesh sieve, and this screen placed on top of a catch pan. The stack was then loaded into a Rotap (RX-29) and shaken with the arm engaged for 4 minutes.
5. After shaking on the Rotap, the material in the pan was discarded, and the material on the screen and the material stuck in the 40 mesh screen were collected and weighed to find the final mass of the sample, MR.

Attrition %=((MO−MR)/MO)×100  Calculation of Attrition %

The results of attrition testing were recorded and are reported in Table 2. Referring to Table 2, the particle integrity of the tested pet litter is good (<1.0%).

Example 7: Clumping Litter Production

The material from Example 1 (using the 500 psi roll back-pressure) was combined with a clumping agent (guar gum). This material was then measured for clumping performance:
1. The litter base material (10 lbs) was added to a lab scale rotational pan mixer (Mars Mineral DP-14).

2. The mixer was set to a low speed setting and guar gum (0.4 lbs) was slowly added.
3. The finished material was then removed from the mixer.

Example 8: Clump Integrity Measurement

The material from Example 7 was tested for clump performance according to the following procedure:
1. An 8" diameter sieve with ¾" mesh was stacked on top of a sieve pan and placed on the bottom of a support stand.
2. A trap door assembly was attached to the support stand and positioned ten inches above ¾" sieve.
3. A representative sample of the litter from Example 5 was added to a litter testing pan. The depth of material was three inches.
4. A self-leveling 25 ml burette was positioned on a support stand three inches above the litter surface. This setup was used to dispense 25 ml aliquots of feline urine liquid to the litter surface, forming a clump in the litter. This process was repeated in a variety of location of the litter pan until the desired number of clumps was created (in this case 20 clumps).
5. At the end of the desired time interval (15 min or 24 hr), the clump was removed from the litter, and its mass recorded as W1.
6. The clump was then centered on the trap door mechanism assembled in step 2.
7. Next the lever was actuated to release the trap door, allowing the clump to fall onto the ¾" test sieve.
8. The clump was carefully removed from the screen in a manner which allowed loose material to fall free of the clump, but not in a manner which caused additional damage to the clump. If the clump broke into pieces, largest piece retained on the ¾" screen was selected. If nothing is retained on the screen, the result is zero (0) weight.
9. The clump or largest piece was weighed and the mass recorded as W2.
10. The Percentage of Cohesion value was calculated using the following formula:

$$\% \text{ Cohesion} = (W2(\text{final weight})/W1(\text{initial weight})) \times 100$$

The Percentage of Cohesion values for all clumps were averaged, and the results recorded in Table 2. As shown in Table 2, the Percentage of Cohesion values for the tested pet litter were comparable to that of the current clay litter.

TABLE 2

Summary of Testing Results

| Material Class | Sample | Absorption by % Vol | Bulk Density (lb/ft³) | Attrition (%) | Clump Cohesion: 15 min. (%) | Clump Cohesion: 24 Hours (%) |
|---|---|---|---|---|---|---|
| Raw Material | Expanded Perlite | 40.6 | 4.2 | 2.5 | — | — |
| | Non-swelling (Ca Montmorillonite) Clay | 49.7 | 46.2 | 0.19 | — | — |
| Non-clumping Litter | Example 1 | 69.2 | 33.3 | 0.96 | — | — |
| | Example 2 | 66.4 | 41.2 | 0.25 | — | — |
| | Example 3 | 68.4 | 41.9 | 0.25 | — | — |
| Clumping Litter (CL) | Commercial CL | — | 55.3 | 0.19 | 93.0 | 98.2 |
| | Example 6 | — | 33.3 | 0.96 | 96.5 | 97.2 |

CONCLUSIONS

The results show that the tested pet litter is a low density granular absorbent with good particle integrity and has surprisingly improved absorption relative to traditional clay litter and the pre-processed principal raw material. Specifically, the density is reduced relative to both clumping and non-clumping clay litters (Table 2), the particle integrity is good (<1.0%), and the absorption by volume is surprisingly greater than the non-clumping clay litter benchmark as well as intact granules of expanded perlite of the size −8/+30 mesh (Table 2). The tested absorbent material can be used to formulate a clumping pet litter, and demonstrates comparable clumping to that of the clay-based clumping litter benchmark (Table 2).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of making a pet litter comprising:
    compacting a material comprising expanded perlite fines to form a compacted material comprising expanded perlite fines, wherein the compacting is performed at a pressure from about 500 to about 1,300 psi;
    breaking the compacted material comprising expanded perlite fines to form particles of the compacted material comprising expanded perlite fines;
    separating the particles which have a size within a predetermined size range from a remainder of the particles;
    drying the particles which have the size within the predetermined size range; and
    using the dried particles as at least a portion of the pet litter, wherein the pet litter does not contain activated carbon.

2. The method of claim 1, wherein the expanded perlite fines have a size not greater than about 600 microns.

3. The method of claim 1, wherein the material comprising expanded perlite fines comprises about 0.5 wt. % to about 5.0 wt. % of a binder.

4. The method of claim 3, wherein the binder is selected from the group consisting of (i) a starch, (ii) a clay, and (iii) a starch and a clay.

5. The method of claim 4, wherein at least a portion of the binder is added to the expanded perlite fines as a dry mix before the compacting of the material.

6. The method of claim 4, wherein at least a portion of the binder is pre-blended with water and then added to the expanded perlite fines before the compacting of the material.

7. The method of claim 1, wherein the material comprising expanded perlite fines comprises about 15.0 wt. % to about 25.0 wt. % of water.

8. The method of claim 1, wherein the material comprising expanded perlite fines comprises about 50 wt. % to about 85 wt. % of the expanded perlite fines.

9. The method of claim 1, wherein the predetermined size range is about 595 microns to about 2,380 microns.

10. The method of claim 1, wherein the particles are dried to a moisture content of about 0.25 wt. % to about 10.0 wt. %.

11. A pet litter made by the method of claim 1.

* * * * *